Jan. 24, 1950      F. J. WRIGHT      2,495,493
TOWING HITCH FOR PORTABLE ROLLERS
Filed Oct. 3, 1946

INVENTOR:
FRED J. WRIGHT,
BY
ATTY.

UNITED STATES PATENT OFFICE 2,495,493

TOWING HITCH FOR PORTABLE ROLLERS

Fred J. Wright, Columbus, Ohio, assignor to The Galion Iron Works & Manufacturing Company, a corporation of Ohio Application October 3, 1946, Serial No. 700,970

9 Claims. (Cl. 280—33.44)

This invention relates to a towing tongue or hitch for a portable roller or the like.

An object of the invention is to provide an improved towing tongue or hitch which is not only capable of hitching the roller to a towing vehicle, such as a truck or a tractor, but which may also be adjusted to lift the leveling roll off the ground so that the portable roller may be towed along about its rear wheels or rollers.

Other objects of the invention will appear hereinafter, the novel features and combinations being set forth in the appended claims.

In the accompanying drawings.

Figure 1:
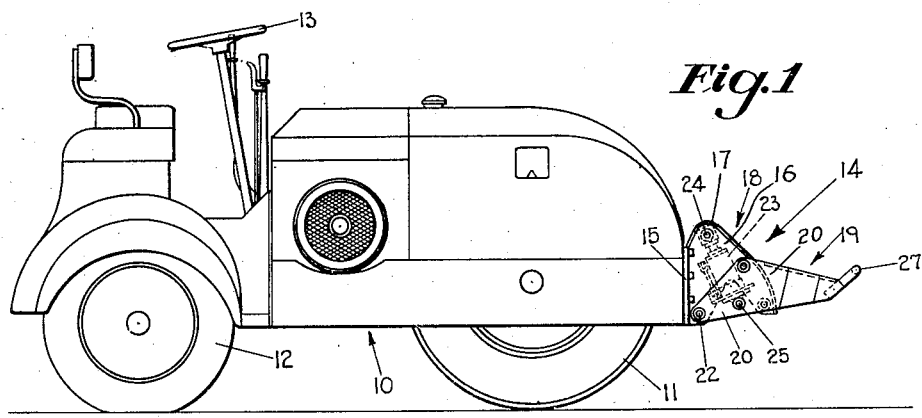
Fig. 1 is a side elevational view of a portable roller including the hitch of my invention.

Fig. 1 of the drawings shows a portable roller which includes a main frame 10 upon which a driving motor is mounted which is connected through controllable gearing to drive a front leveling roll 11 which is journaled on the main frame 10. At its rear end the main frame 10 is supported by a pair of laterally spaced steering wheels 12 which may be steered by an operator through a wheel 13.

The transportation of a portable roller from place to place is preferably effected by lifting the front or main leveling roll off the ground and supporting the front of the portable roller on a towing truck or tractor. I have provided improved towing tongue or hitch means which may be employed to hitch the portable roller onto a towing vehicle and also may be employed to elevate leveling roll 11, lifting it off the ground, while at the same time providing a very efficient and easily operable hitch.

The completely assembled hitch is designated 14 and, as seen in Fig. 1 of the drawings, is attached to the front end of the main frame 10 of the portable roller. Said hitch 14 includes a rear, upright, attaching plate 15 which is provided with a plurality of holes so that it may be bolted at adjusted elevations on the main frame 10 of the portable roller so as to accommodate it to be hitched to various draft vehicles.

Rigidly attached to the plate 15 and extending forwardly therefrom is a drawbar support formed by a pair of upstanding laterally spaced side plates 16 which form walls that are connected together across their tops by a laterally extending cover plate 17, the attaching plate 15, side plates 16 and cover plate 17 all co-operating to provide a combination drawbar support and jack housing 18.

Figure 2:
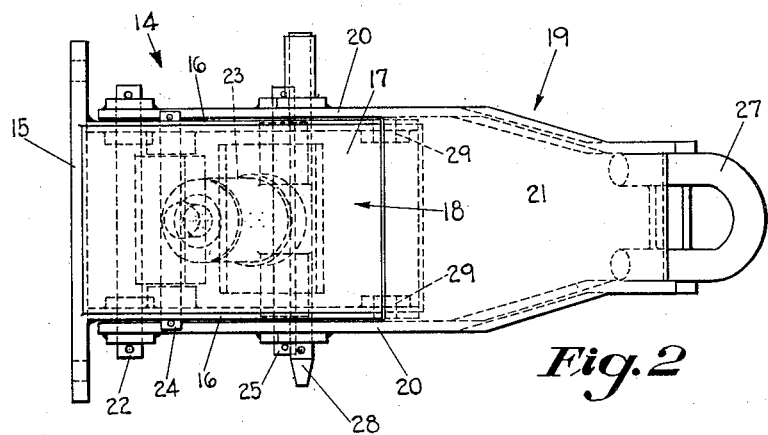
Fig. 2 is a plan view of the towing tongue or hitch.

Pivotally attached adjacent the rear and bottom of the drawbar support 18 for up and down swinging movement with respect thereto is a drawbar 19. Drawbar 19 includes a pair of laterally spaced upstanding side plates 20 connected by a transversely extending top plate 21 all of which co-operate to form a yoke on the drawbar. The drawbar 19, or more specifically the rear ends of side plates 20 which co-operate to form the yoke thereof, interfits with the spaced walls of the combination drawbar support and jack housing 18 by straddling them, and, as above mentioned, provides the rearward pivotal connection between the drawbar 19 and the bottom of the combination drawbar support and jack housing 18 through the pivotal connection therewith by way of horizontally extending transverse pin 22. Appropriate bearing areas are provided between the plates 20 and the pin 22 and between the plates 16 and said pin 22, as best illustrated in Fig. 2 of the drawings.

The drawbar support 18 provides an effective housing which is open at the bottom and within and between the upstanding walls 16 of which there is carried a jack 23, preferably a hydraulic jack, the piston rod of which is pivotally connected to the walls 16 of the combination drawbar support and jack housing by a pin 24 that extends through aligned openings one of which is formed in each wall or plate 16 and adjacent the top of the drawbar support 18. The base of the cylinder of jack 23 is pivotally connected by a pin 25 to the side plate 20 of the drawbar 19 along a horizontal axis forward of the axis of pin 22. One of the side plates 16 preferably has an opening 26 therein to permit the insertion of an operating handle for the jack 23 which may be expanded or contracted in a manner well understood in the art of jacks.

Adjacent its front end the drawbar 19 is provided with an eye or U-shaped ring 27 which is adapted to be received by a hook, clevis or the like on the towing or supporting vehicle.

In the operation of the device the portable roller will be positioned adjacent the rear of the towing vehicle and the jack 23 contracted to allow the eye or ring 27 to be attached to the hook, clevis or other attaching means on the rear end of the towing vehicle, such as a truck or tractor. Thereupon, the jack 23 will be expanded and this will swing the drawbar 19 about the horizontal axis of pivot pin 22.

Since the eye or attaching ring 27 is attached to the towing vehicle this swinging movement under the action of the jack 23 will transfer the load normally on the roll 11 to the towing vehicle until the roll 11 is elevated or lifted off the ground a desired amount. Under such circumstances the roller will be supported at its front end on the towing vehicle and at its rear on the steering wheels 12 which are preferably locked in position against tilting or longitudinal movement.

Preferably in order to take the load off the jack 23, after the hitch 14 is expanded, or, in other words, after the drawbar 19 is swung downwardly, said drawbar 19 is provided with a pair of aligned holes adjacent the tops of plates 20 which are adapted to receive a locking pin 28 which may extend between selected pairs of aligned openings formed in the upright laterally spaced plates or walls 16, one pair being near the middle of the drawbar support 18 with relation to its elevation, the other pair being adjacent the bottom thereof.

Figure 3:
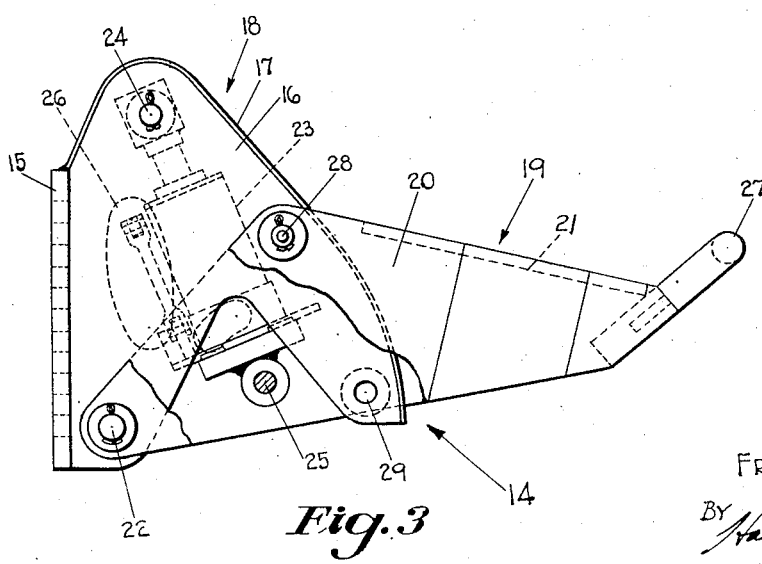
Fig. 3 is a side elevational view of the towing tongue or hitch, with parts broken away.

In Figs. 1 and 3 of the drawings the pin 28 extends through the upper set of said aligned openings and thus locks the drawbar 19 to the support 18 in its upper or contracted position. When the drawbar 19 is swung downwardly or expanded, as above mentioned, pin 28 may be inserted through the lower pair of aligned openings or holes in plates or walls 16, one of which is seen at 29, thereby locking said hitch in its expanded or roll lifting position. This, as above mentioned, takes the load off the jack 23. A cotter key or other locking means may be employed to lock the pin 28 in either of the pair of aligned holes in the drawbar support 18 through which it may be extended.

From the foregoing description of my hitch and its operation it will be apparent that I have provided an improved, more rugged, and more compact hitch that may be readily and adjustably positioned upon a vehicle and a hitch wherein the jack lies substantially wholly within an area defined by laterally spaced upstanding structural walls and peripheries thereof whereby the jack is protected. It will also be obvious that I prefer to connect at least a portion of the peripheral edges of the laterally spaced upright walls to form a protecting and structural housing in which the jack is carried.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A hitch including a normally upright attaching plate for attaching it to a vehicle, means including said attaching plate forming a housing having upstanding laterally spaced walls, means forming a drawbar straddling said housing and mounted thereto for swinging movement, a hydraulic jack carried between the spaced walls of said housing pivoted thereto and to said drawbar for swinging the latter with respect to said housing, and locking means for locking said drawbar and housing in at least one position, said locking means including a pin adapted to be received in aligned openings formed by both said drawbar and said housing.

2. A hitch including a normally upright attaching plate for attaching it to a vehicle, means including said attaching plate forming a housing having upstanding laterally spaced walls, means forming a drawbar straddling said housing and mounted thereto for swinging movement, a hydraulic jack carried between the spaced walls of said housing pivoted thereto and to said drawbar for swinging the latter with respect to said housing, and locking means for locking said drawbar and housing in at least one position.

3. A hitch including a normally upright attaching plate for attaching it to a vehicle, means including said attaching plate forming a housing having upstanding laterally spaced walls, means forming a drawbar straddling said housing and mounted thereto for swinging movement, a jack carried between the spaced walls of said housing pivoted thereto and to said drawbar for swinging the latter with respect to said housing, and locking means for locking said drawbar and housing in at least one position.

4. A hitch including a normally upright attaching plate for attaching it to a vehicle, means including said attaching plate forming a housing having upstanding laterally spaced walls, means forming a drawbar straddling said housing and mounted thereto for swinging movement, and a jack carried between the spaced walls of said housing pivoted thereto and to said drawbar for swinging the latter with respect to said housing.

5. A hitch including a normally upright attaching plate for attaching it to a vehicle, means including said attaching plate forming a drawbar support having upstanding laterally spaced walls, a drawbar interfitting with said spaced walls pivoted for up and down swinging movement, a jack carried between the spaced walls of said drawbar support connected thereto and to said drawbar for swinging the latter, and locking means for locking said drawbar and drawbar support in at least one position with respect to each other, said locking means including a pin adapted to be received in aligned openings formed by both said drawbar and drawbar support.

6. A hitch including a normally upright attaching plate for attaching it to a vehicle, means including said attaching plate forming a drawbar support having upstanding laterally spaced walls, a drawbar interfitting with said spaced walls pivoted for up and down swinging movement, a jack carried between the spaced walls of said drawbar support connected thereto and to said drawbar for swinging the latter, and locking means for locking said drawbar and drawbar support in at least one position with respect to each other.

7. A hitch including a normally upright attaching plate for attaching it to a vehicle, means including said attaching plate forming a drawbar support having upstanding laterally spaced walls, a drawbar interfitting with said spaced walls pivoted for up and down swinging movement, and a jack carried between the spaced walls of said drawbar support connected thereto and to said drawbar for swinging the latter.

8. In a hitch, a drawbar member, a drawbar support member, one of said members including laterally spaced upstanding plates adapted to interfit with the other member, pivot means associated with said laterally spaced upstanding plates interconnecting said drawbar member and drawbar support member for pivotal movement with respect to each other, a jack carried between said laterally spaced upstanding plates for swinging said drawbar with respect to said drawbar support member, said jack lying substantially wholly within the area between said laterally spaced upstanding plates and defined by their peripheries, and locking means co-operating with said laterally spaced upstanding plates for locking said drawbar member and drawbar support member in at least one position with respect to each other.

9. In a hitch, a drawbar member, a drawbar support member, one of said members including laterally spaced upstanding plates adapted to interfit with the other member, pivot means associated with said laterally spaced upstanding plates interconnecting said drawbar member and drawbar support member for pivotal movement with respect to each other, and a jack carried between said laterally spaced upstanding plates for swinging said drawbar with respect to said drawbar support member, said jack lying substantially wholly within the area between said laterally spaced upstanding plates and defined by their peripheries.

FRED J. WRIGHT.

REFERENCES CITED

The following references are of record in the file of this patent:

UNITED STATES PATENTS

| Number | Name | Date |
| --- | --- | --- |
| 1,429,144 | Jones | Sept. 12, 1922 |
| 1,939,950 | Brown | Dec. 19, 1933 |
| 2,171,255 | Keeler | Aug. 29, 1939 |
| 2,210,907 | Erickson | Aug. 13, 1940 |
| 2,375,970 | Williams | May 15, 1945 |